W. J. TOLLERTON.
LOCK NUT.
APPLICATION FILED APR. 10, 1914.
1,105,222. Patented July 28, 1914.
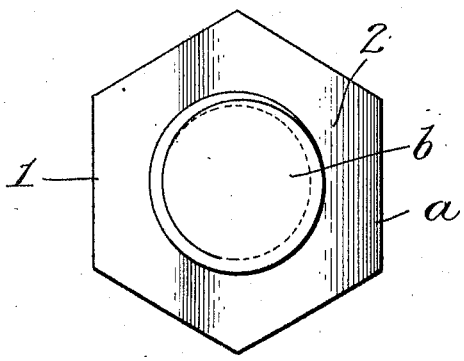
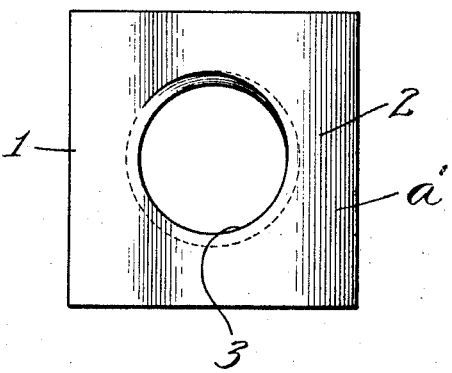
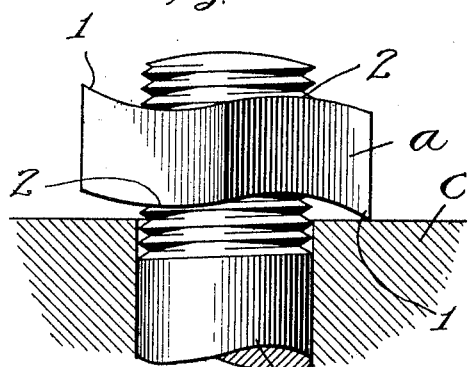
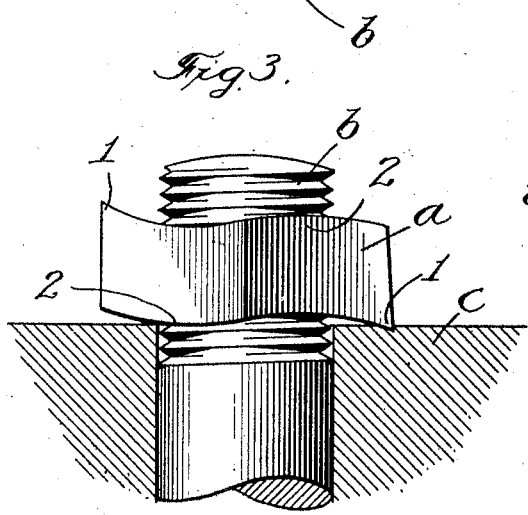
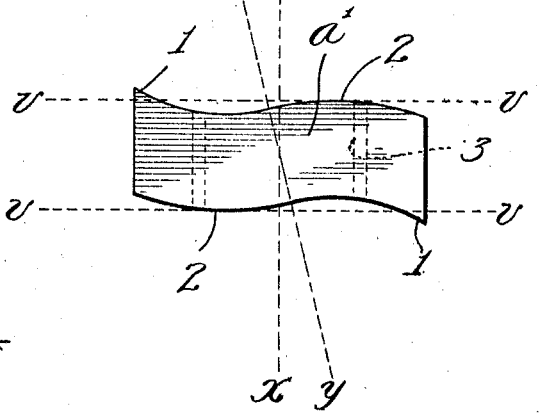
Inventor:
William J. Tollerton
By Peirce, Fisher & Clapp
Attys.

UNITED STATES PATENT OFFICE.

WILLIAM J. TOLLERTON, OF CHICAGO, ILLINOIS.

LOCK-NUT.

1,105,222.   Specification of Letters Patent.   Patented July 28, 1914.

Application filed April 10, 1914. Serial No. 830,890.

*To all whom it may concern:*

Be it known that I, WILLIAM J. TOLLERTON, a citizen of the United States, and a resident of Chicago, county of Cook, State of Illinois, have invented certain new and useful Improvements in Lock-Nuts, of which the following is a full, clear, and exact description.

The improvement relates to lock nuts and seeks to provide a simple, inexpensive form which, when threaded on the nut and forced against an abutting face or part, will be securely held in place.

The invention consists in the features of improvement hereinafter set forth, and more particularly pointed out in the appended claims.

In the drawings, Figure 1 is a plan view of the improved lock nut mounted on a bolt. Fig. 2 is a view in elevation showing the nut in position when it first engages the face or the part through which the bolt extends. Fig. 3 is a similar view showing the nut still further forced to place against the part or abutment about the bolt. Fig. 4 is a plan view showing a nut of slightly different form. Fig. 5 is a view in elevation of the nut shown in Fig. 4.

The improved nut is of simple form and may be of any suitable polygonal outline. The nut $a$, shown in Figs. 1, 2 and 3, is hexagonal, while the nut $a'$ shown in Figs. 4 and 5 is square.

The improved nut, as shown in Figs. 2, 3 and 5, is S-shaped in section and its opposite abutting faces are preferably reversely curved, the form being such that each abutting face is provided with a projecting, beveled or wedge-shaped edge 1 and with a protuberant, rounded, contacting portion 2. The nut may be conveniently formed in quantity from a metal bar which is rolled or otherwise suitably formed, so that it is correspondingly S-shaped in cross-section.

The nut is tapped at a slight angle to the normal line extending through the center of the nut. In Fig. 5, the line $x$—$x$ represents the axis of the tapped opening 3 of the nut, and, as shown, is at a slight angle to the normal line $y$—$y$. This angle is such that the beveled or wedge-shaped edges 1 project beyond the rounded contacting portions 2. That is to say, if lines $v$—$v$ are drawn tangent to the rounded contacting portions 2 and at right angles to the axis $x$—$x$, the beveled edges 1 will project slightly beyond these lines, as indicated in Fig. 5.

When the nut is threaded on the bolt $b$ against a part or abutment $c$, through which the bolt extends, the wedge-shaped edge 1 of the inner face of the nut will first engage the outer face of the part or abutment $c$, as shown in Fig. 2. The continued turning of the nut will produce a slight distortion thereof and of its threads, and will bring the rounded contacting portion into engagement with the surface of the abutment $c$ and at the same time, the wedge-shaped edge 1 will cut into the surface of the part $c$. The rounded contacting portion, after it engages the face of the part $c$ is still free to revolve and will not, of course, cut this surface. This arrangement enables all the force applied in turning up the nut to be devoted to forcing the single wedge-shaped edge 1 into the surface, and also in taking the camber or curve out of the bottom of the nut or distorting it, so that the nut is securely jambed against the face of the abutment or part $c$ and upon the threads of the bolt. This provision of the contacting portion and the wedge-shaped edge which coöperate to distort the nut and force the wedge into the abutting surface, is distinctive of the present improved lock nut.

It is obvious that the improved lock nut may be employed in connection with an ordinary nut which is first threaded on the bolt.

Changes may be made in the details set forth without departure from the essentials of the invention as defined in the claims.

I claim as my invention:—

1. A lock-nut having its abutting face shaped to form a beveled edge and a rounded contacting portion on opposite sides of the axis of the nut, said edge being arranged to engage the face against which the nut is forced before the latter is engaged by said rounded contacting portion, substantially as described.

2. A lock nut S-shaped in section and having its opposite faces each provided with a projecting beveled edge and a protuberant contacting portion on opposite sides of the axis of the nut, said edge and said contacting portion being arranged to successively engage the face against which the nut is forced, substantially as described.

3. A lock nut S-shaped in section and having reversely curved abutting faces, each provided with a beveled edge and a rounded contacting portion on opposite sides of the axis of the nut, said nut being tapped at a slight angle to the normal line passing through the center of the nut, substantially as described.

4. A lock nut S-shaped in section and having reversely curved abutting faces, each provided with a beveled edge and a rounded contacting portion on opposite sides of the axis of the nut, said nut being tapped at a slight angle to the normal line passing through the center of the nut, and said edges being arranged to engage the part against which the nut is forced before the latter is engaged by said rounded contacting portions, substantially as described.

WILLIAM J. TOLLERTON.

Witnesses:
E. A. WOODWORTH,
B. N. MOSER.